United States Patent [19]

Flies

[11] 4,326,125
[45] Apr. 20, 1982

[54] MICROELECTRONIC MEMORY KEY WITH RECEPTACLE AND SYSTEMS THEREFOR

[75] Inventor: William P. Flies, Burnsville, Minn.

[73] Assignee: Datakey, Inc., Burnsville, Minn.

[21] Appl. No.: 163,307

[22] Filed: Jun. 26, 1980

[51] Int. Cl.³ .......................... H04Q 9/00; G06K 5/00
[52] U.S. Cl. ...................................... 235/443; 70/277; 194/4 R; 340/825.31; 361/171
[58] Field of Search ................ 235/430, 443, 439–442; 340/149 R, 149 A, 147 R, 164 A, 365 R; 307/10 AT; 194/4 R, 4 C, 4 E; 200/42 R, 43, 44, 45, 46, 61.66; 179/2 CA, 6.3 CC; 70/277, 71, 279, 282, 283, 278, DIG. 46; 361/171, 172

[56] References Cited

U.S. PATENT DOCUMENTS

| | | |
|---|---|---|
| 2,981,935 | 4/1961 | Nasoni . |
| 3,098,996 | 7/1963 | Kretzmer . |
| 3,098,997 | 7/1963 | Means . |
| 3,544,769 | 12/1970 | Hedin . |
| 3,641,498 | 2/1972 | Hedin . |
| 3,651,464 | 3/1972 | Hedin et al. . |
| 3,660,831 | 5/1972 | Nicola et al. . |
| 3,673,467 | 6/1972 | Eisenreich . |
| 3,686,659 | 8/1972 | Bostrom . |
| 3,754,214 | 8/1973 | Matsumoto et al. . |
| 3,761,892 | 9/1973 | Bosnyak et al. . |
| 3,806,882 | 4/1974 | Clarke . |
| 3,812,403 | 5/1974 | Gartner . |
| 3,842,629 | 10/1974 | Pazer et al. . |
| 3,845,362 | 10/1974 | Roe . |
| 3,848,229 | 11/1974 | Perron et al. . |
| 3,859,634 | 1/1975 | Perron et al. . |
| 3,872,435 | 3/1975 | Cestaro . |
| 3,889,501 | 6/1975 | Fort . |
| 3,971,916 | 7/1976 | Moreno . |
| 4,023,161 | 5/1977 | Sasaki . |
| 4,297,569 | 10/1981 | Flies ................................ 235/443 |

FOREIGN PATENT DOCUMENTS

| | | |
|---|---|---|
| 1321529 | 2/1963 | France . |
| 2146802 | 3/1973 | France . |
| 2353103 | 12/1977 | France . |
| 2363837 | 3/1978 | France . |
| 1427825 | 3/1976 | United Kingdom . |

*Primary Examiner*—Thomas A. Robinson
*Attorney, Agent, or Firm*—Schroeder, Siegfried, Vidas, Steffey & Arrett

[57] ABSTRACT

This invention relates to improvements in the functional design of electrical key-like devices and electrical receptacles for use in combination therewith. Electronic circuitry systems, such as computers and other operating circuits, interface with the key-like devices through the receptacle. The keys contain a microelectronic circuit element, e.g., a microelectronic circuit chip or die, having an electrical lead or leads exposed along the length of the key for contacting electrical leads in the receptacle when the key is inserted therein and rotated to a "locked" position. The keys are particularly designed to interface with a processor and program memory system, that is, a computer.

18 Claims, 9 Drawing Figures

U.S. Patent  Apr. 20, 1982  4,326,125
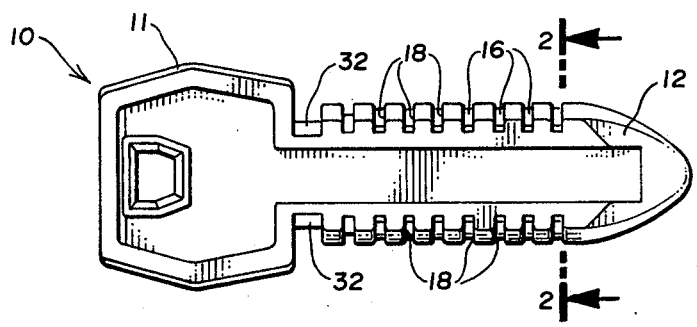
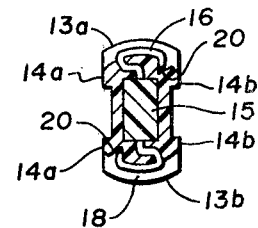
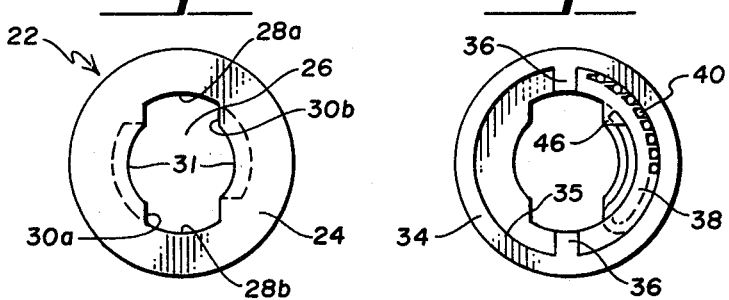
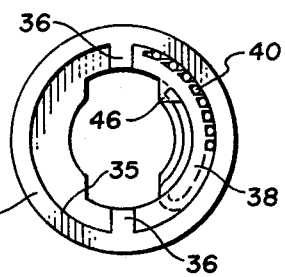
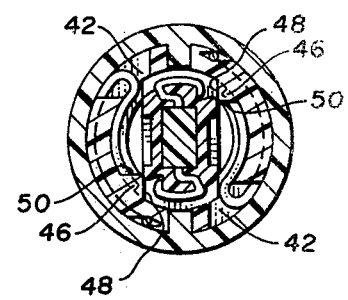
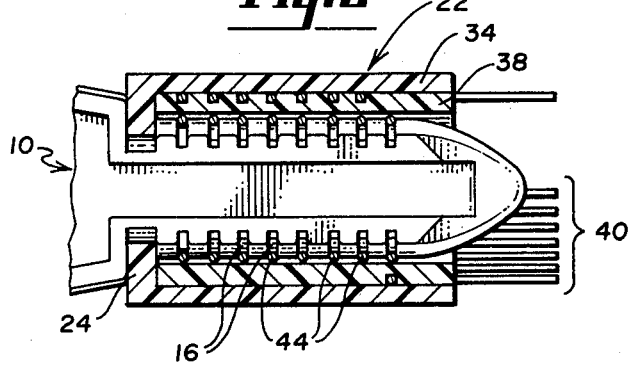
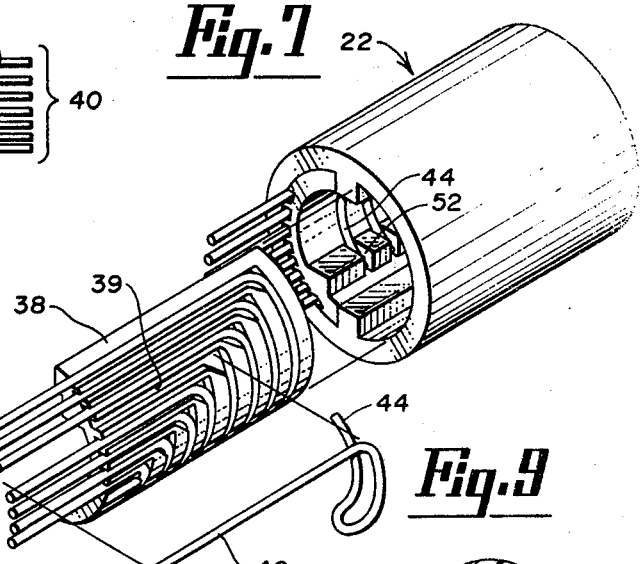
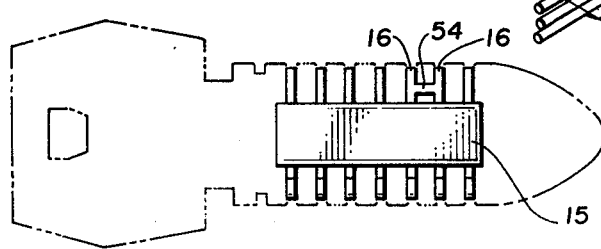
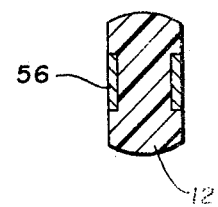

MICROELECTRONIC MEMORY KEY WITH RECEPTACLE AND SYSTEMS THEREFOR

DESCRIPTION

Background of the Invention

This invention is an improvement over the invention of related U.S. Pat. No. 4,297,569, issued Oct. 27, 1981, the disclosure of which is incorporated herein by reference.

Electrical devices of various types have been proposed in which a master circuit or electrical operating system of some kind, such as a computer system, is activated by use of a portable device that is combined with the electrical system, as by insertion into a slot or the like to make electrical contact or connection with the system. This invention is concerned broadly with such portable devices and with such systems. However, it is specifically concerned with electrical key-like devices that carry data in the form of a microelectronic circuit component, chip or die. The electrical system with which the key is typically used may take the form of a computer, that is an electrical circuit means including a program memory and a processor. Other electrical systems such as various control circuits may also be used. Such key-like devices have been described in detail in U.S. Pat. No. 4,297,569, issued Oct. 27, 1981.

There exists a need for key-like devices that can retain relatively large amounts of data bits (information) in a portable medium with small size and very fast data access and data transfer rates (times). It is desirable that such a storage/access device or key be of very sturdy construction and of a size that can be enclosed within one's hand. It should have no moving parts so that reliability is maximized and access time is minimized. Its storage media should have the capability of being easily customized to required data patterns.

Movable memory devices do not satisfy these requirements because they are too large and are very susceptible to data damage if continually handled in every day environments. Stationary memory devices, although small, must be a part of the computer circuitry to be accessed. These devices heretofore have had to be soldered or expertly placed into circuits by experienced individuals in order to be used.

The portable access type memories heretofore in use, such as magnetic strip cards, punched cards, etc. that are of a portable size, contain only very limited data capacities. These devices are also very susceptible to data damage, as by magnetic fields, and to physical damage.

The key device described in U.S. Pat. No. 4,297,569, issued Oct. 27, 1981, in its preferred form as a microelectronic data key, provides relatively large amounts of data bit storage with very fast access time and in a durable medium. The microelectronic data key described therein is not only concerned with the storage of data (information) and its introduction into a computer or other electrical circuit system, but also with the portability of microelectronic circuit chips or dies, whether the purpose of the electrical circuit system into which the key is introduced is the storage of information or any other purpose such as a control function.

Microelectronic memory or data storage circuits, although extremely small, are currently not portably usable in a form that can be routinely inserted or otherwise connected into a computer or the like for use and then removed therefrom following completion of a desired input function. The design of the microelectronic key of the above-identified copending application facilitates the use of microelectronic devices in such portable devices. The microelectronic device is packaged in a relatively sturdy configuration that may be inserted into a receptacle of an access device or the like for a variety of purposes. The primary feature of the preferred embodiment is the capability of carrying large amounts of data in a protected key-like device that can be accessed very rapidly into a computer or the like. The device is small enough to be carried on the person.

The device provides unique microelectronic packaging and electrode access that facilitates the portability of a directly usable microelectronic circuit or other electrical circuit components. The particular purpose of any microelectronic or other circuit component utilized in the devices and systems of this invention is not important within the broad scope of the invention. Any circuit that is portable and can augment any other existing circuit is usable in the context of this invention. The key-like device is specifically designed for insertion into a receptacle and rotation therein to a "locked" position by twisting to establish contact through the receptacle to a master electrical system, such as a computer or the like.

BRIEF SUMMARY OF THE INVENTION

The present invention relates to improvements on the key and receptacle of U.S. Pat. No. 4,297,569, issued Oct. 27, 1981. The improvements relate to functional design features of the key and the receptacle which improve the manufacturability of the devices, improve the cooperation between the key and the receptacle, decrease the likelihood of physical damage to the key and receptacle, and diminish or eliminate problems created by the static electricity.

One feature of the present invention relates to the design of the key and the keyway opening so that the front end wall of the receptacle serves to prevent rotation of the key in the receptacle except when the key is fully inserted, to guide the fully inserted key during rotation to the "locked" position, and to prevent withdrawal of the key from the receptacle once rotation has begun.

A second feature of the invention relates to a multipart construction of the receptacle including semi-cylindrical liner members inserted in the body of the receptacle to carry the receptacle leads. The inner surfaces of the liner members define the receptacle keyway and carry longitudinal ridges which serve the multiple functions of guiding the key during insertion into the receptacle, permitting rotation of the key in only one direction, stopping rotation of the key when it has reached the "locked" position, and receiving the free ends of the receptacle leads within the receptacle.

Further features of the present invention relate to the design of the key. Grooves in the key which carry the microprocessor leads have been provided with notches into which the end of the key leads may be fitted. The key is designed so that it may be inserted into the receptacle in either of the two positions and has been provided with a presence/posture switch which signals the supporting electronic system, i.e., the computer, as to the presence and the posture of the key in the "locked" position of the receptacle. To reduce or eliminate problems created by static discharges across the electrically conductive portions of the devices, the receptacle may be provided with a grounded lead or the surface of the key provided with a layer of anti-static agent.

BRIEF DESCRIPTION OF THE DRAWINGS

FIG. 1 is a side elevation of the key-like device of the invention.

FIG. 2 is a sectional elevation of the key with shallow depth of field taken along line 2—2 of FIG. 1.

FIG. 3 is a key hole end elevation of the receptacle.

FIG. 4 is an end elevation of the receptacle end opposite that of FIG. 3 with one of the receptacle liner members removed.

FIG. 5 is a vertical sectional elevation taken through the center of the receptacle with the key inserted in the unlocked position and viewed in a similar fashion as in FIG. 4.

FIG. 6 is a plan sectional view of the receptacle on the horizontal axis and with the key inserted and rotated to the "locked" position.

FIG. 7 is a pictorial exploded view of the receptacle in isometric view with one receptacle liner separated from the receptacle body and a receptacle contact removed to one side of the liner and located respectively by projection lines.

FIG. 8 is a side elevation of an integrated circuit located within the key which is shown in phantom for descriptive purposes.

FIG. 9 is a typical sectional elevation of the key showing a layer of anti-static agent on the side surfaces thereof.

DETAILED DESCRIPTION OF THE INVENTION

Referring now to the drawings, and particularly to the FIGS. 1 and 2, there is shown a portable, random access, data device, or key generally designated 10. Key 10, like the device of the already identified copending application, comprises non-conductive head and insert body portions 11 and 12, respectively. The insert body portion is generally rectangular in cross-section having a major dimension between the upper and lower curved surfaces 13a and 13b, and a minor smaller dimension between the side surfaces 14a and 14b. An integrated circuit (chip) 15 is embedded within the insert body portion of the key, preferably by molding the key around the chip. Leads 16 extend from the chip through the body portion of the key to the upper and lower surfaces thereof where they are bent to lie within the spaced contact grooves 18.

It has been found that during handling of the key, leads 16 are occasionally bent out of contact grooves 18. For instance, when keys are put into pockets or purses the free ends of leads 16, if merely laid in the bottom of the contact grooves, occasionally become snagged on material or damaged by other objects in a pocket or purse. By providing contact grooves 18 with notches 20, into which the free ends of key contacts 16 are fitted, this snagging problem has been eliminated.

FIGS. 3-7 show various views of receptacle, generally designated 22, which receives key 10. Receptacle 22 includes a front end wall 24 having a keyway opening 26. The keyway opening is a compound shape comprising a generally rectangular slot having a major dimension with opposing upper and lower surfaces 28a and 28b and a minor dimension having opposing side surfaces 30a and 30b. The minor dimension expands near the center of the slot so that the central portion of the keyway opening is circular, indicated at 31. The dimensions of the slot are slightly larger, preferably less than 0.010 inches, than the major and minor dimensions of the key. The diameter of circular portion 31 of the keyway opening is similarly slightly larger than the thickness of the key between the bottoms of guide grooves 32 which are located on the body portion of the key adjacent the head thereof, as seen in FIG. 1. The width of the guide grooves 32 is also only slightly larger than the thickness of receptacle front wall 24 so that when the key is inserted and rotated within the receptacle, as shown in FIG. 6, front wall 24 is snugly engaged by guide grooves 32. The depth and/or width of gruide grooves 32 are greater than the respective dimensions of contact grooves 18. This allows only the guide grooves to engage end wall 24 thereby preventing rotation of the key in the receptacle except when the key is fully inserted.

The receptacle itself is a multi-part construction having a hollow outer body 34 and a cylindrical inner surface 35. Diametrically opposed liner alignment ridges 36 project inwardly from surfaces 35. Two semi-cylindrical insert liners 38 are fitted between ridges 36.

Liner members 38 contain channels 39 on the outer surfaces thereof which carry conductive leads 40 from the rear of the receptacle to spaced holes 42. A portion of receptacle leads 40 are thus able to enter to the inner surfaces of liner members 38 through holes 42. The leads are bent along the circumferential inner surface of the liner to form receptacle contacts 44.

In the embodiment shown, the inner surfaces of liner members 38, together with the inner surfaces of liner alignment ridges 36, define the keyway of the receptacle. Alternatively, the liner members may be designed to fit over alignment ridges 36 so that the keyway is formed solely by the inner surfaces of the liner members. This alternative construction would permit use of a single cylindrical liner within the receptacle body.

The keyway is generally cylindrical, the diameter being slightly larger, typically by about 0.005 to 0.010 inches, than the major dimension of the insert portion of the key. Diametrically opposed longitudinal ridges 46 project into the keyway. Ridges 46 are aligned with the slot portion of keyway opening 26. Each ridge has a surface 48 which serves as an insertion guide means for the key. Surfaces 48 insure that the key is inserted straight into the receptacle by contacting diametrically opposed side surfaces of the insert portion of the key. Surfaces 48 also prohibit rotation of the key in one direction, thereby establishing a single direction (clockwise in the embodiment of the drawings) for rotation of the key to the "locked" position.

Ridges 46 have a second surface 50 which serves as stop means for stopping rotation of the key when the key has reached the "locked" position.

Spaced notches 52 in ridges 46 receive the ends of receptacle contacts 44. The spacing of holes 42 and notches 52 corresponds to that of the contact grooves of the key. This arrangement maintains the alignment of the receptacle contacts so that when the key is inserted into the receptacle and rotated to the "locked" position as shown in FIG. 6, contact grooves 18 engage the receptacle contacts and bring the corresponding key leads 16 into electrical contact with the receptacle contacts.

The embodiment of the key design disclosed in the already identified copending application included a protrusion from one surface thereof which had to be aligned with a special slot in the keyway in order for the key to be inserted. This permitted the key to be inserted in the receptacle in only one position, thereby assuring correct correspondence between the key contacts and the receptacle contacts. Those protrusions, however, were susceptable to damage by bending or breaking. The present improved design utilizes a key which has no such protrusions and may, therefore, be inserted into the keyway with the nominally designated "upper" surface 13a facing either up or down. This feature eliminates the danger of key damage and facilitates ease of key insertion, but sacrifices the assurance that the individual keyway contacts have only a single corresponding key contact.

To ensure proper interaction of the key with the supporting electronic system to which the receptacle leads are attached, the key is provided with a presence/posture switch which permits the support electronics to both detect the presence of the key, and to determine the posture of the key in the receptacle when the key is in the locked position. The switch is conveniently provided by creating the short circuit path between two available key leads as is shown in FIG. 8 by electrically conductive connector 54. The shorted leads may be on the same or on opposing surfaces of the key so long as they are not directly opposite each other on opposing surfaces. If the key has contact grooves available which have not been filled by leads from the encapsulated chip, the short circuit path may be provided between separate leads placed in such open grooves rather than, as shown in FIG. 8, across chip leads. Insertion and rotation of the key in the receptacle completes a detection circuit in the support electronics thereby signaling the presence and the position of the key within the receptacle. The supporting electronic system is programmed to adjust its interaction with the key according to the posture of the key in the receptacle.

Because the body of the key and the receptacle are made of electrically insulating materials, static charges may form on the surfaces of the key or the keyway which may interfere with the functioning of, or even damage, an integrated circuit embedded in the key upon discharge of the static charges. This problem may be solved by either of the constructions described below.

If one or both of the "contact" grooves adjacent to the "guide" grooves of the key is unused, the corresponding receptacle lead or leads 40a may be grounded. As the key is inserted, portions thereof carrying static charges will pass lead 40a first, thereby allowing the charges to safely discharge to ground before nearing sensitive device contacts.

Alternatively, the side surfaces of the key may be provided with a layer of anti-static agent 56 which provides a continuous conductive path to the fingers of the key operator for the static discharges. The layer of anti-static agent must be separated from the contact leads of the key so as to prevent short circuiting between the leads. Anti-static agents commonly used in the plastics fabricating industries are materials which improve conductance of plastic surfaces by absorbing and holding an invisible layer of water from the atmosphere on the surface of a plastic item. Major types of anti-static agents include quaternary ammonium compounds, amines and their derivatives, phosphatic esters, fatty acid polyglycol esters, and polyhydric alcohol derivatives such as glycerine and sorbitol. The anti-static agent may be applied to the surface of the key directly as a topical coating or indirectly as a component of a polymer layer separately molded or glued to the key surface.

Having described the invention, the exclusive rights thereto are set forth as follows:

I claim:

1. In combination:
 a key-like device having head and insert body portions, the insert body portion being adapted for insertion into a receptacle and rotation therein to a "locked" position and including in cross-section:
  a major dimension with opposing upper and lower arcuate surfaces; and
  a smaller minor dimension with opposing side surfaces,
 the insert body portion having a plurality of transverse grooves formed on the major surfaces thereof, said grooves including two opposing "guide" grooves adjacent to the head portion of the key and a plurality of spaced "contact" grooves, the "guide" grooves having a dimension greater than the "contact" grooves;
  an electrical circuit element encapsulated within the key, the element including a plurality of electrical leads, each of which extend into one of the "contact" grooves and lie therein to form a plurality of electrical contacts; and
 a receptacle defining a keyway for the insert portion of the key, the keyway including:
  a plurality of spaced electrical contacts, each such keyway contact comprising a conductive lead positioned in the keyway for contacting a correspondingly spaced contact on the insert portion of the key upon rotation of the key to a "locked" position in the receptacle;
  insertion guide means within the keyway for guiding the insert portion of the key during insertion of the key with the contacts thereof angularly displaced from the keyway contacts; and
  stop means within the keyway for stopping rotation of the key when the key has reached the "locked" position, the receptacle having a front end wall with a keyway opening therein, the keyway opening of the receptacle shaped to cooperate with "guide" grooves on the insert portion of the key to comprise rotation guiding and locking means for preventing withdrawal of key when the key is rotated and guiding the key during rotation to the "locked" position so as to bring the correspondingly spaced insert and keyway contacts together in contacting pairs.

2. A keylike device having head and insert body portions, the insert body portion being adapted for insertion into a receptacle and rotation therein to a "locked" position and including in cross-section:
 a major dimension with opposing upper and lower arcuate surfaces; and
 a smaller minor dimension with opposing side surfaces,
the insert body portion having a plurality of transverse grooves formed on the major surfaces thereof, said grooves including two opposing "guide" grooves adjacent to the head portion of the key and a plurality of spaced "contact" grooves, the "guide" grooves having a dimension greater than the "contact" grooves, and
 an electrical circuit element encapsulated within the key, the element including a plurality of electrical leads, each of which extend into one of the "contact" grooves and lie therein to form a plurality of electrical contacts.

3. The article of claim 1 or claim 2 wherein the greater dimension of the "guide" grooves on the key insert portion is the depth thereof.

4. The article of claim 1 or claim 2 wherein the greater dimension of the "guide" grooves on the key insert portion is the width thereof.

5. The article of claim 1 or 2 wherein each of said spaced "contact" grooves on the key insert portion has a notch at one end thereof for receiving the free end of the key contact in said groove.

6. The article of claim 1 or 2 wherein the electrical circuit element embedded within the key includes a presence/posture switch for signaling the presence and posture of the key in the "locked" position of the receptacle.

7. The article of claim 6 wherein the presence/posture switch comprises a short circuit path between two of the electrical leads in the "contact" grooves of the key which are not directly opposed to each other.

8. The article of claim 1 or 2 including a layer of an anti-static agent along the length of the key on a side surface thereof without contacting said key contacts.

9. An improved key-like device having head and insert body portions, the insert body portion being adapted for insertion into a receptacle and rotation therein to a "locked" position and including in cross-section:
    a major dimension with opposing upper and lower arcuate surfaces; and
    a smaller minor dimension with opposing side surfaces,
the insert body portion having a plurality of transverse grooves formed on the major dimension surfaces thereof, and
    an electrical circuit element encapsulated within the key, the element including a plurality of electrical leads each of which extend into one of the transverse grooves to form a plurality of electrical contacts therein,
    wherein the improvement comprises a layer of an anti-static agent applied to a side surface of the key without contacting said contacts.

10. An improved key-like device having head and insert body portions, the insert body portion being adapted for insertion into a receptacle and rotation therein to a "locked" position and including in cross-section:
    a major dimension with opposing upper and lower arcuate surfaces; and
    a smaller minor dimension with opposing side surfaces, the insert body portion having a plurality of transverse grooves formed on the major surfaces thereof, and
an electrical circuit element encapsulated within the key, the element including a plurality of electrical leads each of which extend into one of the transverse grooves and lie therein to form a plurality of electrical contacts,
    wherein the improvement comprises a notch in each said groove which carries one of said contacts for receiving the free end of said contact.

11. A receptacle defining a keyway for an insert portion of a key-like device, the keyway including:
    a plurality of spaced electrical contacts, each such keyway contact comprising a conductive lead positioned in the keyway for contacting a correspondingly spaced contact on the insert portion of the key upon rotation of the key to a "locked" position in the receptacle;
    insertion guide means within the keyway for guiding the insert portion of the key during insertion of the key with the contacts thereof angularly displaced from the keyway contacts, and
    stop means within the keyway for stopping rotation of the key when the key has reached the "locked" position,
the receptacle having a front end wall with a keyway opening therein, the keyway opening of the receptacle shaped to cooperate with two opposing "guide" grooves on the insert portion of the key to comprise rotation guiding and locking means for preventing withdrawal of key when the key is rotated and guiding the key during rotation to the "locked" position so as to bring the correspondingly spaced insert and keyway contacts together in contacting pairs.

12. The article of either claim 1 or 11 wherein the keyway opening is a compound shape comprising a generally rectangular shaped slot, the slot including a major dimension with opposed arcuate surfaces, and a smaller minor dimension, the minor dimension expanding toward the center of the slot so as to form a circular opening portion at the center of the slot.

13. The article of either claim 1 or claim 11 wherein the receptacle includes two semi-cylindrical liner members each having an inner keyway surface and an outer surface, said liner surfaces defining a portion of the keyway, and each said liner includes a plurality of spaced holes therethrough for conducting said keyway leads through the liner to the outer surfaces thereof and means on the outer surface of the liner for carrying said keyway contact leads in spaced relation from said holes to the rear of the receptacle.

14. The article of either claim 1 or claim 11 wherein a keyway contact near the front end wall of the receptacle is grounded.

15. A receptacle defining a keyway for an insert portion of a key-like device, the keyway including:
    a plurality of spaced electrical contacts, each such keyway contact comprising a conductive lead positioned in the keyway for contacting a correspondingly spaced contact on the insert portion of the key upon rotation of the key to a "locked" position in the receptacle;
    insertion guide means within the keyway for guiding the insert portion of the key during insertion of the key with the contacts thereof angularly displaced from the keyway contacts;
    stop means within the keyway for stopping rotation of the key when the key has reached the "locked" position, and
    rotation guide means for guiding the insert portion during rotation to the "locked" position in the receptacle and bringing the key and keyway contacts together in contacting pairs,
the receptacle having a multi-part construction comprising:
    a hollow outer body member; and
    at least one liner member within said outer body member, said liner member having a keyway surface defining at least a portion of the keyway and including means on the liner member for carrying said keyway leads in spaced relation from the keyway to the rear of the receptacle.

16. The article of claim 1, 11 or 15 wherein the receptacle includes two diametrically opposed longitudinal ridges extending into the keyway and each said ridge has one surface which comprises said insertion guide means and a second surface which comprises said rotation stop means.

17. The article of claim 16 wherein said ridges have a plurality of notches therein for receiving the ends of the keyway contacts.

18. A receptacle defining a keyway for an insert portion of a key-like device, the receptacle having an opening through which the key insert portion is inserted into the keyway and the receptacle including:
   a plurality of spaced electrical contacts, each such keyway contact comprising a conductive lead positioned in the keyway for contacting a correspondingly spaced contact on the insert portion of the key upon rotation of the key to a "locked" position in the receptacle;
   insertion guide means within the keyway for guiding the insert portion of the key during insertion of the key with the contacts thereof angularly displaced from the keyway contacts;
   stop means within the keyway for stopping rotation of the key when the key has reached the "locked" position, and
   rotation guide means for guiding the insert portion during rotation to the "locked" position in the receptacle and bringing the key and keyway contacts together in contacting pairs,
wherein at least one of the keyway contacts near said opening is grounded.

* * * * *